United States Patent [19]

Breault et al.

[11] Patent Number: 5,407,459
[45] Date of Patent: Apr. 18, 1995

[54] PROCESS FOR THE PREPARATION OF CALCIUM ALUMINATES FROM ALUMINUM DROSS RESIDUES

[75] Inventors: Raymond Breault, Chicoutimi; Sylvain P. Tremblay, Jonquiere; Yvan Huard, Thetford Mines; Gilles Mathieu, Aylmer, all of Canada

[73] Assignees: Alcan International Limited, Montreal; Les Sables Olimag Inc., Thetford Mines, both of Canada

[21] Appl. No.: 125,594

[22] Filed: Sep. 23, 1993

[51] Int. Cl.⁶ .................................. C22B 21/06
[52] U.S. Cl. .................................. 75/303; 75/568; 75/570; 75/672; 75/751
[58] Field of Search .............. 75/303, 568, 570, 672, 75/751

[56] References Cited

U.S. PATENT DOCUMENTS

| | | | |
|---|---|---|---|
| 4,014,685 | 3/1977 | Jones | 75/570 |
| 4,395,282 | 7/1983 | Braun | 75/751 |
| 4,490,173 | 12/1984 | Schwer | 75/303 |
| 4,769,067 | 9/1988 | Cochran | 75/672 |
| 4,941,914 | 7/1990 | Craig et al. | 75/309 |
| 4,959,100 | 9/1990 | Dube et al. | 75/10.19 |
| 4,960,460 | 10/1990 | Dube et al. | 75/10.19 |
| 4,997,476 | 3/1991 | Lindsay et al. | 75/10.21 |
| 5,135,565 | 8/1992 | Gens | 75/10.21 |

*Primary Examiner*—Peter D. Rosenberg
*Attorney, Agent, or Firm*—Dvorak and Traub

[57] ABSTRACT

The present invention is concerned with a process for the preparation of sintered calcium aluminates that can generally be used as a protective cover for liquid metals, and particularly steel, and the process comprising the steps of mixing calcium oxide, or its precursor, particles and aluminum dross residue, such as NOVAL ™; calcining the resulting mixture; maintaining a calcining temperature of 1200° C. or higher for approximately 5 minutes or more which is sufficient to form a friable sintered product rich in calcium aluminates; and recovering the sintered product after cooling. Optionally, calcium fluoride, or other fluoride can be added to the starting mixture, if it is not already contained in the dross residue.

32 Claims, 2 Drawing Sheets

$C_3A = Ca_3Al_2O_6$
$C_{12}A_7 = Ca_{12}Al_{14}O_{33}$
$CA = CaAl_2O_4$
$CA_2 = CaAl_4O_7$
$CA_6 = CaAl_{12}O_{19}$
COR = CORUNDUM
L = LIQUID

SYSTEM $CaO-Al_2O_3$. $C = CaO$; $A = Al_2O_3$

PROCESS FOR THE PREPARATION OF CALCIUM ALUMINATES FROM ALUMINUM DROSS RESIDUES

FIELD OF THE INVENTION

The invention relates to a process for the preparation of calcium aluminates by calcining a mixture of aluminum dross residues and raw lime or limestone.

BACKGROUND OF THE INVENTION

Calcium aluminates such as $3CaO.Al_2O_3$; $CaO.Al_2O_3$; $CaO.2Al_2O_3$ and $CaO.6Al_2O_3$ and $12CaO.7Al_2O_3$ are extremely useful in many fields of metallurgy and in general as refractory materials.

Calcium aluminates are used in large amounts in the steel industry as a steel slag flux and as a desulfurizing agent for steel melts. For example, Schwer in U.S. Pat. No. 4,490,173 discloses a composition as an additive used in steelmaking. The proposed additive compositions include lime and a compound selected from a group comprising bauxite (which is the ore containing alumina) and mixtures of calcium aluminate and bauxite. Calcium aluminates are also important components in the preparation of cements, particularly aluminous cements.

Aluminum dross is formed whenever aluminum or an aluminum alloy is melted in air or other oxidizing atmosphere, and is thus obtained in large quantities in aluminum production and fabrication plants. Such dross is normally treated either by a plasma or in a conventional furnace with a salt mixture, to remove recoverable aluminum metal, leaving a dross residue having reduced aluminum content. The main components in dross residues include alumina, aluminum nitride, aluminum metallic, spinel ($MgAl_2O_4$) and other minor components ($Fe_2O_3$, $SiO_2$, $MgO$). Dubé et al. in U.S. Pat. Nos. 4,959,100 and 4,960,460 disclose treatment processes for recovering aluminum from aluminum dross hence producing the aluminum dross residue known in the trade as NOVAL TM (trademark of Alcan International Limited, Montreal, Canada). The composition of NOVAL TM brand aluminum dross residues is discussed in the '100 patent. Aluminum dross residues are frequently classified as hazardous material. Consequently, the disposal or transformation of the dross residues is of prime economic and environmental importance.

It is known that calcium aluminates may be obtained from aluminum dross or aluminum dross residues. For example, the possibility is well known in the industry to produce calcium aluminates by fusion of lime (calcium oxide $CaO$) and alumina (aluminum oxide $Al_2O_3$). Gens discloses a process, in U.S. Pat. No. 5,135,565, for heating aluminum dross (not the residue) and lime at temperatures in excess of the dross slag melting point of approximately 1400° C. to produce two main products, aluminum metal and calcium aluminate.

Lindsay et al. in U.S. Pat. No. 4,997,476 disclose a plasma process for recovering free aluminum from dross. The dross is charged in a plasma torch rotary furnace and is heated to its molten state. The free aluminum coalesces and is poured from the furnace. The resulting dross residue accumulates and lines the wall of the furnace. Periodically, the residue is scraped off and converted into useful non-metallic products.

Additionally there exist numerous methods, either chemical or thermochemical, which have been developed to synthesize calcium aluminates.

For example, Morozova et al. in *Cement & Concrete Research*. 1988, 18, 375–388 proposes the dissolution of calcium carbonate in an aqueous solution of aluminum chloride followed by a reaction with ammonium hydroxide to produce mixed Al-Ca hydroxides, which are dried and calcined to form $CaO.Al_2O_3$, $CaO.2Al_2O_3$, $CaO.6Al_2O_3$ and $12CaO.7Al_2O_3$, which are used in high alumina cement.

In *Chem. Papers*, 1987, 41(6), 723–729, Nerad describes the preparation of $3CaO.Al_2O_3$ and $12CaO.7Al_2O_3$ by a precursor method, which consists in dissolving metallic aluminum and calcium carbonate in diluted nitric acid and reacting of the aluminum-calcium nitrates with tartaric acid, heating the resulting mixture, evaporating the liquids, and calcining the remaining solid to give the above calcium aluminates.

Other processes teach compositions used as additives for steelmaking and iron foundries. Fiodorov et al. (Lensovet Technological Institute, Leningrad) produce $CaO.Al_2O$, $12CaO.7Al_2O_3$ and $3CaO.Al_2O_3$ by immersing pellets of limestone and alumina into molten pig iron. The synthesis of the aluminates is said to be achieved within 30 and 2000 seconds. The temperature of the reactions varies from 1300°–1500° C. The nature of the end products is a function of the composition of the mixture of raw materials, which is adjusted to suit high-alumina cements.

Craig et al. in U.S. Pat. No. 4,941,914 disclose a desulfurizing additive for molten pig iron. The additive is comprised mainly of calcium carbide and a minor admixture of a calcium aluminate slag. The calcium carbide is said to act as a mechanical binding agent in the additive mixture. Optionally, asphalt is proposed as providing better cohesion to the additive mixture. Interestingly, the patent mentions that the calcium aluminate slag can be prepared by heating and melting a mixture of 50 to 65% lime, 25 to 35% alumina, and 0 to 10% calcium fluoride. It is to be noted that the melting point of such mixture is reported in the prior art as being approximately 1400° to 2000° C. (FIG. 231, "Metal Oxide Systems" page 102).

Furthermore a grave technical difficulty arises when aluminum dross residue is charged in a furnace. Dust and other small particles tend to fly out of the furnace consequently failing to convert to calcium aluminates and generally causing nuisance and pollution.

For these reasons, the production of calcium aluminate slag by a direct melting heat treatment of alumina and lime or limestone or other additives is presently not cost effective.

Accordingly, there is a substantial need in the industry for an improved process for producing calcium aluminates from aluminum dross residue such as NOVAL TM brand aluminum dross residues. It is particularly desirable that such process be cost effective and environmentally responsible.

SUMMARY OF THE INVENTION

In accordance with the present invention, there is now provided a process for the preparation of a sintered material essentially comprising calcium aluminates, the process comprising the steps of:

a) mixing aluminum dross residues, preferably NOVAL TM, with CaO or its precursor, particles;

b) calcining the mixture at temperature of at least 1200° C., and preferably 1250° C. to 1300° C., for a period of time of approximately 5 minutes or more which is sufficient to form a friable sintered product essentially consisting of calcium aluminates; and c) recovering the sintered product.

Optionally, calcium fluoride ($CaF_2$) or other suitable fluoride is added to the mixture of step a) above, if it is not already contained in the aluminum dross residue.

In optional embodiments of the invention additional steps can be performed between steps a) and b). The optional steps are to:

(i) contact the resulting mixture of step (a) with water;

(ii) shape the resulting mixture into green shapes smaller than 1 inch in diameter and preferably $\frac{1}{4}$ to $\frac{1}{2}$ inch in diameter;

(iii) age said green shapes in a moist atmosphere for approximately not more than 12 hours; and/or (iv) add rehydratable alumina, preferably ElectroStatic Precipitator (ESP) dust to the mixture of step (a).

The sintered material obtained with the process of the present invention can be used, for example, in foundry applications as a protective cover slag on liquid steel or any other metal, usually when the temperature is above 1400° C.

According to one aspect of the invention, the calcination is performed in a rotary kiln, and the temperature in step b) is preferably between 1200°–1400° C., and most preferably between 1250° and 1300° C. Upon completion of the process, the friable sintered particles can be ground to the desired size.

In a preferred embodiment, the aluminum dross residues are aluminum dross residue having a particle size smaller than $\frac{1}{2}''$.

IN THE DRAWINGS

DETAILED DESCRIPTION OF THE INVENTION

Figure 1:
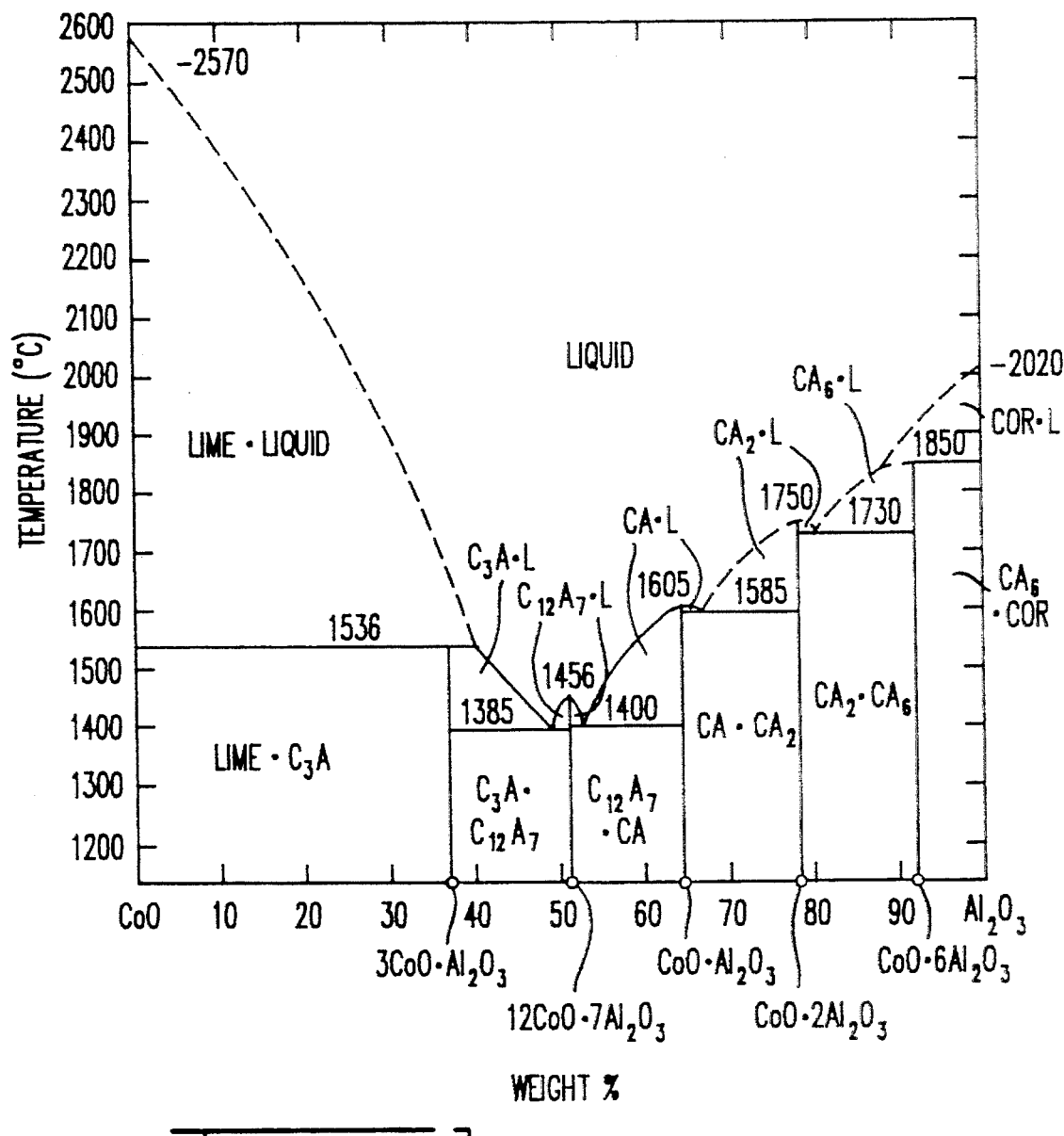
FIG. 1 is a phase equilibrium diagram of for the system $CaO.Al_2O_3$ wherein $C = CaO$ and $A = Al_2O_3$.
Figure 2:
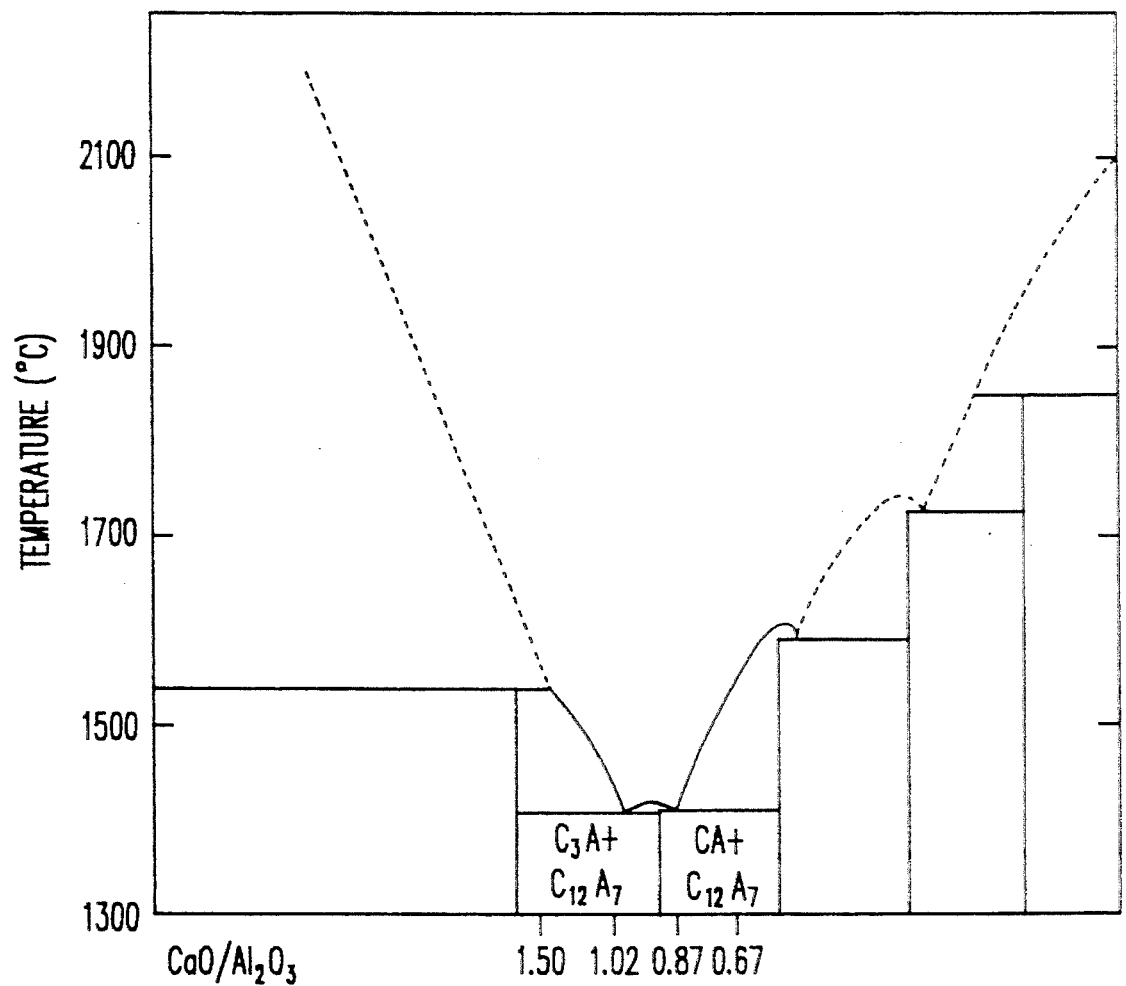
FIG. 2 is an expended portion of FIG. 1 wherein the X-axis shows the $CaO.Al_2O_3$ ratio rather than the weight percent.

The novel process of the present invention comprises the use of aluminum dross residue as a source of alumina for the preparation of calcium aluminates.

Dross residues, such as NOVAL TM, brand aluminum dross residues are preferred to either pure alumina or alumina from other sources because its use surprisingly results in complete reaction with lime or limestone at temperatures as low as 1200° C. This in turn results in the formation of large product particles which can then be ground and classified. The use of pure alumina, for example, results in the production of small easily fractured particles. Furthermore, impurities found in the dross residue (such as aluminum nitride and aluminum metal) facilitate the sintering process, as it will be discussed below.

Aluminum dross is normally treated to remove recoverable aluminum metal in order to leave a residue of reduced metal content, which will be referred to in the present application as dross residues. The actual way in which the aluminum is removed from the dross affects the nature and composition of the dross residue and, to a certain extent, the way in which the dross residues should be treated before it is used in the process of the present invention. For this reason, a description of dross treatment methods is provided briefly below.

First of all, aluminum-containing dross may be heated by a thermal plasma while being agitated in a rotatable furnace according to the method described in prior U.S. Pat. No. 4,959,100. This procedure causes residual metal particles in the dross to melt and coalesce and form a continuous phase which can then be tapped off. Aluminum nitride may be present in the dross residue thus obtained, as well as alumina. Steps are often taken to avoid the formation of aluminum nitride because it decomposes to alumina and ammonia gas during prolonged exposure to moisture, for example when dumped in landfill sites, and the resulting generation of ammonia is considered to be an unacceptable pollutant (currently limited to 25 ppm by the EPA in the United States). However, for the reasons given below, the presence of aluminum nitride in the dross residues becomes a significant advantage in the process of the present invention and consequently no step need be taken to prevent its formation during the aluminum dross treatment.

A more conventional way of treating aluminum dross to remove contained aluminum is to heat the dross in a conventional furnace with a salt mixture which reduces the surface tension of the molten aluminum and causes the aluminum droplets to coalesce. Disadvantageously, this produces a dross residue of high salt content which is polluting if discarded in such a form. Moreover, this salt-containing dross residue while it can be used directly in the process of the present invention is generally unsatisfactory because the salt adversely affects the nature of the product. The dross residue obtained from the salt process should therefore be washed with water in order to dissolve its salt content before being used in the process of the present invention. After such washing, the dross residue is wet and should be dried to remove adhering water.

The dross residue produced by either of the above processes has a high alumina to silica ratio. It usually contains a minimum of 50% alumina (or alumina precursor) and generally at least 65%.

Minerals present in the dross residues and in the CaO or its precursors have a significant influence on the chemistry of the process of the present invention, as well as on the melting point of the resulting calcium aluminates, this latter feature being of great importance in the field of protective slags for liquid metals.

With respect to the melting point of aluminum dross residues, the presence of alkali ($K_2O$, $Na_2O$), iron oxides and silica during the heat treatment potentially contribute to lower the melting point of the clinker and, therefore, favours the production of a material having a melting point lower than 1400° C. to 2000° C. On the other hand, the presence of MgO adversely affects the melting point of the product unless it is complexed with silica and alumina to form cordierite $2MgO.2Al_2O_3.5SiO_2$.

As far as the chemistry of the process is concerned, it has previously been mentioned that dross residues contain aluminum nitride which decomposes into alumina and ammonia gas upon prolonged exposure to moisture (e.g. in landfill. sites). In the process of the present invention, the heat treatment at high temperature, i.e. between 1250° C. and 1375° C.) in oxidizing conditions, i.e. air, prevents the formation of ammonia as illustrated by the following chemical reaction:

$$2AlN + 3/2\ O_2 \rightarrow Al_2O_3 + N_2 \uparrow$$

This reaction is highly exothermic and provides heat to the system. The presence of aluminum nitride in the dross residues thus represent a significant advantage for the process of the present invention.

Another heat contribution is made by the oxidation of metallic aluminum contained in the dross residue at temperature above 850° C., as illustrated by the following chemical reaction:

$$2Al + 3/2\ O_2 \rightarrow Al_2O_3$$

This reaction is also strongly exothermic, thus further reducing the amount of external heating required for effectively carrying out the process of the present invention.

Accordingly, dross residues, such as NOVAL TM, i.e. containing effective amounts of aluminum nitride or aluminum metal, surprisingly and unexpectedly can be calcined and made to react well below the melting point of the mixture of reactants and provide calcium aluminates. It has been found that a temperature as low as 1200° C. and preferably 1250° C. is sufficient to obtain satisfactory results.

As previously stated, the starting mixtures must also exhibit sufficient size and mechanical resistance to avoid loss of material in the draft of the kiln. It is has been found, surprisingly and unexpectedly, that treatment of dross residue with water allows water to act as a chemical and mechanical binding agent to form advantageous shapes of mixtures of dross residue and calcium oxide or its precursors to essentially avoid the previous problem experienced of loss of material in the draft of the kiln.

As was previously discussed, it is known that dross residues such as NOVAL TM brand aluminum dross residues contain aluminum nitride and free aluminum metal. It is theorized that those substances can react exothermically, slowly at ambient temperatures with water or water vapour to form rehydratable $Al_2O_3$, and rapidly, at higher temperatures with oxygen to form crystalline forms of $Al_2O_3$. At high temperature the exothermic reaction has been found to supply a significant amount of heat to the reaction mixture, and hence reduce the amount of external heat required to achieve the conversion reaction to calcium aluminates. However, at lower temperatures, some of the aluminum nitride and aluminum metal, when exposed to air and water can react exothermically to form aluminum hydroxide ($Al(OH)_3$), ammonia ($NH_3$) and hydrogen ($H_2$), as per the following:

$$AlN + 3H_2O = NH_3 + Al(OH)_3;$$

$$Al + 3H_2O = 3/2 H_2 + Al(OH)_3;$$

The ammonia produced in the first reaction can be collected so as to avoid pollution as opposed to a similar reaction taking place at a landfill site. In the present invention, the resulting mixture containing rehydratable alumina can be combined with lime or limestone and then mixed with sufficient water and transferred to a shaper such as a pelletizer, granulator or extruder where particles are allowed to reach a desired size, the shapes are then allowed to age for a period of not more than 12 hours. During that time the reaction with water will provide chemical bonds between the particles thereby conferring excellent mechanical resistance properties to the pellets. The mixture is then charged in a kiln and heated to at least 1200° C., and preferably 1250° C. to 1300° C., and kept at that temperature for between 5 minutes or more thereby converting the mixture to calcium aluminates. In contradistinction to the prior art, in the present invention, the mixture is not required to be heated to the temperatures reaching the mixture's molten state.

Optionally, additional alumina dust, such as Electro-Static Precipitator (ESP) dust, may be added to the aluminum dross residue to facilitate the shaping stage and to strengthen the green shapes. This would also avoid using up the aluminum nitride and free aluminum metal (in conversion to rehydratable alumina) to the point where the effect on the temperature for conversion to calcium aluminates would be adversely affected.

Dross residues also contain variable quantities of magnesium oxide in the form of spinel ($MgAl_2O_4$), particularly if the dross residues originated from magnesium-aluminum alloys. Small amounts of silica and other refractory oxides may also be present. Traces of alkali fluorides are also present in the dross residues. A typical aluminum dross residue composition is shown in Table 1.

TABLE 1

| Chemical composition of Dross Residue. (NOVAL TM) | | |
|---|---|---|
| Component | Possible Content (% wt) | Typical Content (% wt) |
| $Al_2O_3$* | 50–100 | 50–65 |
| AlN | 0–30 | 15–30 |
| Al (metal) | 0–10 | 3–5 |
| MgO | 0–50 | 5–10 |
| $SiO_2$ | 0–10 | 1–2 |
| $CaF_2$ | 0–2 | <2.0 |
| NaF | 0–4 | <2.0 |

*Including the $Al_2O_3$ in the spinel ($MgOAl_2O_3$)

During the calcination process, the fluoride associated with either the sodium or calcium will react to form sodium or calcium aluminum oxy-fluoride compounds. These compounds, which have a eutectic around 1475° C. may possibly have also a beneficial effect on the melting point of the reaction mixture and be responsible for the high reactivity of the dross residue with the calcium oxide. As stated earlier, the magnesium ions present will remain unchanged as magnesium spinel ($MgAl_2O_4$), but this compound has a high melting point and has no deleterious effects on the product. It should be noted however, that the aluminum values in the spinel will not be converted into calcium aluminate.

It has been found, surprisingly, that the addition of calcium fluoride, or other fluoride, if not originally present in sufficient quantity in the aluminum dross residue, will further contribute to a reduction in the temperature at which the mixture may be converted to calcium aluminates. More precisely, the presence of calcium fluoride ($CaF_2$), in a ratio of about 0.5 to 2 parts, and preferably about 1 part per 100 parts of total reactants mixture of aluminum dross residues and CaO further contributes to lower the temperature at which the mixture is converted to calcium aluminates.

Limestone has a chemical composition much less variable than aluminum dross residue. A chemical analysis of two products commercially available, namely Stalco TM, manufactured and sold by Graybec Calc. Inc., Joliette, Quebec, and Calco TM, manufactured and sold by Les Carrières Calco, Portneuf, Quebec, are shown in Table 2.

TABLE 2

Chemical composition of Stalco ™ and Calco ™

| Component | Stalco ™ (wt %) | Calco ™ (wt %) |
|---|---|---|
| $CaCO_3$ | 96.0* | 94.4* |
| $SiO_2$** | 2.0 | 2.9 |
| $Al_2O_3$ | 0.3 | 0.7 |
| $Fe_2O_3$ | 0.2 | 0.17 |
| $K_2O$ | — | 0.18 |

*Upon heating at 900° C., 44% of $CaCO_3$ is lost on ignition in gaseous $CO_2$, leaving approximately 53.8 and 53.3 wt % of CaO for Stalco ™ and Calco ™ respectively.
**$SiO_2$ form silicate complexes during heating Calcium oxide or its precursor, such as, lime or limestone, can be used in the process of the present invention. It will become obvious to those skilled in the art that because of its much cheaper price, limestone is a preferred product. However, the calculations must be made with respect to the amount of calcium oxide that will be provided, since it is this product that reacts with alumina.

The process of the present invention essentially comprises the co-calcination of lime or limestone and dross residues in appropriate proportions and at temperature suitable to form a clinker of calcium aluminates containing mainly $12CaO.7Al_2O_3$. The size of the particles of dross residues is preferably lower than ⅛" to ensure that all the aluminum nitride contained therein reacts with oxygen. Lime and limestone are generally available as powders, and therefore can be used as such. The preferred (theoretical) concentrations of starting materials in the compositions to be calcined are obtained from the phase diagram illustrated in FIG. 1, after taking into consideration the loss on ignition of gaseous $CO_2$ if limestone is used as a starting material. Those values are 50.5% CaO and 49.5% $Al_2O_3$ (i.e. ratio of $CaO/Al_2O_3$ of 1.02) or 46.5% CaO and 53.5% $Al_2O_3$ (i.e. ratio of $CaO/Al_2O_3$ of 0.87). Pure $12CaO.7Al_2O_3$, contains 48.5% CaO and 51.5% $Al_2O_3$.

The sintered material obtained with the process of the present invention comprises calcium aluminates such as $3CaO.Al_2O_3$, $CaO.Al_2O_3$, $CaO.2Al_2O_3$ and $CaO.6Al_2O_3$ and $12 CaO.7Al_2O_3$; the latter being present predominantly. The material possesses inter alia a low melting point, i.e. <1400° C., good absorption properties of contaminants of liquid metals, and protection against gaseous pick-up from the atmosphere, which makes it appropriate for covering liquid metals in metallurgical processes, particularly in steel-making. When used as a cover slag, it is necessary that the sintered material be in liquid form. Therefore, the temperature involved in the metallurgical process must be at least above the melting point of the sintered material.

The process of the present invention surprisingly requires very little energy input during calcination, since dross residues contain several components which react exothermically during the calcination and liberate important amounts of energy. The process of the present invention has also the benefit of disposing of dross residue in an effective and environmentally responsible manner.

EXPERIMENTAL

A first series of tests were directed to the production of a sintered material having a $CaO/Al_2O_3$ ratio of 0.87, while another series had for target a 1.02 ratio. The preparation mode of raw materials to achieved these ratios is discussed below.

Initial experiments were conducted in a three-meter rotary kiln. The raw materials mixtures were calculated approximately to satisfy the end products requirements, i.e. a $CaO/Al_2O_3$ ratio approaching 0.87 or 1.02 in order to obtain a sintered material having a high content in $12CaO.7Al_2O_3$, thus possessing a melting point lower than 1400° C. The experimental results were mainly investigated with regards to the products, using X-ray diffraction analysis to identify the mineral phases and a heating microscope to determine the melting point (according to accepted technique of D. S. Buist described in Trans. Brit. Ceram. Soc., 1970, 69(1), 15–20). When the products had satisfactory mineral composition and melting temperature, they were submitted to chemical analysis for the main components, particularly for the CaO and $Al_2O_3$ to establish their ratios and verify their accordance to the equilibrium phase diagram of FIG. 1. More complete analyses were made on the most promising products.

The following example is provided for illustrating the present invention and should not be construed as limiting its scope.

EXAMPLE 1

Dross residue (plasma treated) described in Table 1 and limestone Calco ™ were mixed in approximate proportion to produce a material suitable in composition to meet the requirement of a ratio of 0.87 $CaO/Al_2O_3$, and heated in a rotary kiln at 1315° C. for about 30 minutes, until the product started to agglomerate. The kiln was then adjusted to retain the raw material mixture for 1 hour in the heating area at a temperature of 1315° C. The resulting product was a hard agglomerate, similar in texture to a clinker. A representative sample was cut, ground into particles of about 150 mesh and submitted to X-ray diffraction and heating microscope. $12CaO.7Al_2O_3$ was identified as the principal phase of the sintered material (melting point=1390° C.). Spinel, in minor quantity, was the only other mineral positively identified by X-ray diffraction in the sintered material. The chemical analysis gave 43.0% by weight of CaO and 49.8% by weight of $Al_2O_3$, for a $CaO/Al_2O_3$ ratio of 0.863. The material was found to also contain 2.7% by weight of $SiO_2$, 3.9% by weight of MgO, 0.34% by weight $Fe_2O_3$, 1.36% by weight of fluorine (likely in the form of $CaF_2$) and a loss on ignition of 0.2% by weight.

EXAMPLE 2

Between 50 and 70 parts (preferably 60 parts) of NOVAL ™ brand aluminum dross residues are mixed with from 20 to 50 parts (preferably 20 parts) of calcium oxide, and optionally with about 5 parts of rehydratable alumina, such as ElectroStatic Precipitator (ESP) dust, and 12 parts of water. The mixture is then transferred to a pan pelletizer and shapes, during the shaping, another 6 parts of water are added, shaping is continued until the shapes reach the desired size, usually between ¼ and ½ inch in diameter. The shapes are then placed in a container equipped with a simple air reflux to retain the water vapor, and allowed to age for a period of about 6 to 12 hours during which time there is an exothermic reaction as the water hydrates the rehydratable alumina present in the mixture to make strong hydrate bonds in the shape and raise the temperature of the hydrating agglomerate to 100° C. or higher. If necessary the container is cooled during this reaction to keep the temperature of the contents below 100° C. The resulting shapes exhibit good mechanical resistance and can be charged in a rotary kiln or in a packed bed furnace, fired by natural gas, fuel oil, electrically, by gas plasma or micro waves, and heated to 1250° C. to 1300° C. and kept at the temperature for between 5 to 15 minutes. The resulting sintered mass, containing mainly calcium aluminates, can be easily ground to required size distributions and provides good mechanical and chemical properties for its intended use, for example as an additive in steelmaking.

EXAMPLE 3

The mixture of Example 2 is prepared without the addition of ESP dust. Calcium fluoride is added if not present in the NOVAL TM to provide at least 1 part per 100 parts of total mixture of NOVAL TM brand aluminum dross residues and lime or its precursor. The procedure of Example 2 is then followed. The resulting product is of similar chemical composition and properties as that of Example 2.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A process for the preparation of a sintered mixture of material essentially comprising calcium aluminates, comprising the steps of:
    a) mixing, in essentially solid form, calcium oxide, or a precursor thereof, and aluminum dross residue;
    b) calcining the mixture while in essentially solid form, at a temperature of at least 1200° C., for a period of time of approximately 5 minutes or more;
    c) recovering the sintered mixture.

2. A process according to claim 1 wherein the dross residue is NOVAL TM.

3. A process according to claim 1 wherein the temperature in step b) is between 1250°–1300° C.

4. A process for the preparation of a sintered mixture of material essentially comprising calcium aluminates, comprising the steps of:
    a) mixing, in essentially solid form, calcium oxide, or a precursor thereof, aluminum dross residue, and calcium fluoride so that the amount of calcium fluoride in the resulting mixture is from 0.5 to 10% by weight;
    b) calcining the mixture while in essentially solid form, at a temperature of at least 1200° C., for a period of time of approximately 5 minutes or more;
    c) recovering the sintered mixture.

5. A process according to claim 4 wherein, the amount of calcium fluoride in the said mixture is from 1 to 2% by weight.

6. A process according to claim 4 wherein the dross residue is NOVAL TM.

7. A process according to claim 4 wherein the temperature in step b) is between 1250°–1300° C.

8. A process for the preparation of a sintered mixture of material essentially comprising calcium aluminates, comprising the steps of:
    a) mixing, in essentially solid form, calcium oxide, or a precursor thereof, and aluminum dross residue;
    b) contacting the resulting mixture with water;
    c) shaping the resulting mixture into green shapes generally smaller than 1 inch diameter;
    d) calcining the green shapes, while in essentially solid form, at a temperature of at least 1200° C., for a period of time of approximately 5 minutes or more;
    e) recovering the sintered mixture.

9. The process of claim 8 wherein said green shapes are aged in a moist environment for not more than 12 hours prior to calcination.

10. A process according to claim 8 wherein the dross residue is NOVAL TM.

11. A process according to claim 9 wherein the dross residue is NOVAL TM.

12. A process according to claim 8 wherein the temperature in step b) is between 1250°–1300° C.

13. A process according to claim 9 wherein the temperature in step b) is between 1250°–1300° C.

14. A process for the preparation of a sintered mixture of material essentially comprising calcium aluminates, comprising the steps of:
    a) mixing, in essentially solid form, calcium oxide, or a precursor thereof, and aluminum dross residue;
    b) contacting the resulting mixture with water, thereby causing the rehydration of rehydratable alumina present in the said mixture;
    c) shaping the resulting mixture into green shapes generally smaller than 1 inch diameter;
    d) calcining the green shapes, while in essentially solid form, at a temperature of at least 1200° C., for a period of time of approximately 5 minutes or more;
    e) recovering the sintered mixture.

15. The process of claim 14 wherein said green shapes are aged in a moist environment for not more than 12 hours prior to calcination.

16. A process according to claim 14 wherein the dross residue is NOVAL TM.

17. A process according to claim 15 wherein the dross residue is NOVAL TM.

18. A process according to claim 14 wherein the temperature in step b) is between 1250°–1300° C.

19. A process according to claim 15 wherein the temperature in step b) is between 1250°–1300° C.

20. A process for the preparation of a sintered mixture of material essentially comprising calcium aluminates, comprising the steps of:
    a) mixing, in essentially solid form, calcium oxide, or a precursor thereof, aluminum dross residue, and rehydratable alumina;
    b) contacting the resulting mixture with water, thereby causing the rehydration of rehydratable alumina present in the said mixture;
    c) shaping the resulting mixture into green shapes generally smaller than 1 inch diameter;
    d) calcining the green shapes, while in essentially solid form, at a temperature of at least 1200° C., for a period of time of approximately 5 minutes or more;
    e) recovering the sintered mixture.

21. The process of claim 20 wherein the added rehydratable alumina is ElectroStatic Precipitator (ESP) dust.

22. The process of claim 20 wherein said green shapes are aged in a moist environment for not more than 12 hours prior to calcination.

23. A process according to claim 20 wherein the dross residue is NOVAL ™.

24. A process according to claim 22 wherein the dross residue is NOVAL ™.

25. A process according to claim 20 wherein the temperature in step b) is between 1250°–1300° C.

26. A process according to claim 22 wherein the temperature in step b) is between 1250°–1300° C.

27. A process according to wherein the mixture comprises 20 to 50 parts of calcium oxide or its equivalent amount of a precursor thereof, for 50 to 70 parts of dross residues.

28. A process according to wherein the melting point of the sintered material is less than 1400° C.

29. A process according to claim to wherein the sintered material contains mainly $12 CaO.7Al_2O_3$ and has a melting point lower than 1400° C.

30. A process according to wherein the dross residue consists of particles of less than ½ inch in size.

31. A sintered material to be used as a protective cover slag on liquid metals, whenever prepared by the process of.

32. A sintered material according to claim 31 wherein the metal is steel.

* * * * *

UNITED STATES PATENT AND TRADEMARK OFFICE
CERTIFICATE OF CORRECTION

PATENT NO. : 5,407,459
DATED : April 18, 1995
INVENTOR(S) : PROCESS FOR THE PREPARATION OF CALCIUM ALUMINATES FROM ALUMINUM DROSS RESIDUES It is certified that error appears in the above-identified patent and that said Letters Patent is hereby corrected as shown below:

Claim 27, line 1, before "wherein" insert --claim 1--.

Claim 28, line 1, before "wherein" insert --claim 1--.

Claim 29, line 1, after "claim" and before "to" insert --1--, line 1, after "claim" and before "wherein", delete "to".

Claim 30, line 1, before "wherein" insert --claim 1--.

Claim 31, line 3, after "of" insert --claim 1--.

Signed and Sealed this

Fourteenth Day of April, 1998

Attest:

BRUCE LEHMAN

*Attesting Officer*  *Commissioner of Patents and Trademarks*